(12) United States Patent
Notake et al.

(10) Patent No.: US 10,641,150 B2
(45) Date of Patent: May 5, 2020

(54) EXHAUST PURIFICATION SYSTEM OF AN INTERNAL COMBUSTION ENGINE

(71) Applicant: TOYOTA JIDOSHA KABUSHIKI KAISHA, Toyota-shi, Aichi-ken (JP)

(72) Inventors: Yasumasa Notake, Numazu (JP); Hiromasa Nishioka, Susono (JP); Keishi Takada, Ashigarakami-gun (JP); Tetsuya Sakuma, Gotemba (JP); Kiyoshi Fujihara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/272,204

(22) Filed: Feb. 11, 2019

(65) Prior Publication Data
US 2019/0316505 A1  Oct. 17, 2019

(30) Foreign Application Priority Data
Apr. 11, 2018 (JP) .................. 2018-076170

(51) Int. Cl.
*F01N 3/20* (2006.01)
*C01B 3/38* (2006.01)

(52) U.S. Cl.
CPC .............. *F01N 3/206* (2013.01); *C01B 3/382* (2013.01); *C01B 3/386* (2013.01); *C01B 2203/0227* (2013.01); *C01B 2203/0261* (2013.01); *C01B 2203/0822* (2013.01); *C01B 2203/0883* (2013.01); *F01N 2240/30* (2013.01); *F01N 2610/04* (2013.01)

(58) Field of Classification Search
CPC .. F01N 2240/30; F01N 2610/04; F01N 3/206; C01B 3/386; C01B 2203/0883; C01B 2203/0822
USPC .................................. 422/168, 176; 60/286
See application file for complete search history.

(56) References Cited

U.S. PATENT DOCUMENTS

| | | | | |
|---|---|---|---|---|
| 6,382,600 B1 * | 5/2002 | Mahr | .................. | B01D 53/9431 261/115 |
| 7,581,387 B2 * | 9/2009 | Bui | ...................... | F01N 13/009 60/286 |
| 7,584,387 B1 * | 9/2009 | Medin | ................... | G06F 11/327 714/47.1 |
| 7,877,983 B2 * | 2/2011 | Kunkel | ............... | B01F 3/04049 239/418 |
| 8,209,958 B2 * | 7/2012 | Hirata | ..................... | F01N 3/208 60/286 |

(Continued)

FOREIGN PATENT DOCUMENTS

| | | |
|---|---|---|
| DE | 10 2016 100 284 A1 | 7/2017 |
| EP | 0 537 968 A1 | 4/1993 |

(Continued)

*Primary Examiner* — Tom P Duong
(74) *Attorney, Agent, or Firm* — Oliff PLC

(57) ABSTRACT

An exhaust treatment catalyst (5) is arranged in the engine exhaust passage, and hydrogen generated in the reformer (6) is supplied through the hydrogen supply pipe (13) to the inside of the engine exhaust passage upstream of the exhaust treatment catalyst (5). Heat exchange fins (15) for heat exchange with exhaust gas flowing through the inside of the engine exhaust passage are formed on the outer circumferential surface of the hydrogen supply pipe (13) inserted inside the engine exhaust passage.

4 Claims, 6 Drawing Sheets

(56) References Cited

U.S. PATENT DOCUMENTS

| | | | | |
|---|---|---|---|---|
| 8,398,924 | B2* | 3/2013 | Hodgson | F01N 3/2066 422/168 |
| 9,670,811 | B2* | 6/2017 | De Rudder | B01F 3/04049 |
| 2002/0162322 | A1* | 11/2002 | Ganzmann | B01D 53/79 60/286 |
| 2006/0191254 | A1 | 8/2006 | Bui et al. | |
| 2007/0144158 | A1* | 6/2007 | Girard | F01N 3/2892 60/324 |
| 2009/0013670 | A1* | 1/2009 | Cooke | F01N 3/2066 60/286 |
| 2009/0313979 | A1* | 12/2009 | Kowada | B01D 53/9431 60/297 |
| 2010/0107612 | A1* | 5/2010 | Yamazaki | B01D 53/90 60/295 |
| 2014/0369890 | A1 | 12/2014 | Hirabayashi et al. | |
| 2017/0198621 | A1 | 7/2017 | Gaiser et al. | |
| 2018/0002175 | A1 | 1/2018 | Takeshima et al. | |

FOREIGN PATENT DOCUMENTS

| | | |
|---|---|---|
| JP | 2921158 B2 | 7/1999 |
| JP | 2008-531921 A | 8/2008 |
| JP | 2010-270664 A | 12/2010 |
| JP | 2018-002549 A | 1/2018 |
| WO | 2013/039091 A | 3/2013 |

\* cited by examiner

FIG. 5

DIESEL FUEL REFORMING REACTIONS

EXPRESSED BY LHV (a) COMPLETE OXIDATION REACTION
  $CH_{1.83} + 1.4575O_2 \rightarrow CO_2 + 0.915H_2O, \Delta H^0 = -600 kJ/mol-C$ (b) PARTIAL OXIDATION REFORMING REACTION
  $CH_{1.83} + 0.5O_2 \rightarrow CO + 0.915H_2, \Delta H^0 = -86 kJ/mol-C$

EXHAUST PURIFICATION SYSTEM OF AN INTERNAL COMBUSTION ENGINE

TECHNICAL FIELD

The present invention relates to an exhaust purification system of an internal combustion engine.

BACKGROUND ART

Known in the past has been an internal combustion engine in which an $NO_X$ purification catalyst is arranged in an engine exhaust passage, a fuel reforming device for generating reformed gas containing hydrogen is provided, high temperature reformed gas containing hydrogen produced in the fuel reforming device is fed to the engine exhaust passage upstream of the $NO_X$ purification catalyst at the time of engine start, and the hydrogen in the supplied reformed gas is used to raise the $NO_X$ purification rate of the $NO_X$ purification catalyst (for example, see Japanese Unexamined Patent Publication No. 2010-270664).

SUMMARY OF INVENTION

Technical Problem

In this regard, in the case of arranging an exhaust treatment catalyst like an oxidation catalyst in an engine exhaust passage, supplying high temperature reformed gas containing hydrogen generated in a fuel reforming device to the inside of the engine exhaust passage upstream of the exhaust treatment catalyst, and trying to make the temperature of the exhaust treatment catalyst rapidly rise by the heat of oxidation reaction of the hydrogen on the exhaust treatment catalyst, if the hydrogen supplied to the inside of the engine exhaust passage ends up reacting with the oxygen contained in the exhaust gas and will be consumed by self igniting before reacting with oxygen on the exhaust treatment catalyst, no heat of oxidation reaction of hydrogen will be generated any longer on the exhaust treatment catalyst and it will become difficult to make the temperature of the exhaust treatment catalyst rapidly rise.

In this case, to make the temperature of the exhaust treatment catalyst rapidly rise, it is necessary to keep the hydrogen supplied to the inside of the engine exhaust passage from reacting with oxygen contained in the exhaust gas and being consumed by self igniting before reacting with oxygen on the exhaust treatment catalyst. However, in the above-mentioned internal combustion engine, this was not considered at all.

Solution to Problem

According to the present invention, there is provided an exhaust purification system of an internal combustion engine comprising: a reformer, an exhaust treatment catalyst arranged in an engine exhaust passage, a hydrogen supply pipe inserted inside the engine exhaust passage upstream of the exhaust treatment catalyst, hydrogen generated in the reformer being supplied to the engine exhaust passage upstream of the exhaust treatment catalyst via the hydrogen supply pipe, and heat exchange fins formed on an outer circumferential surface of the hydrogen supply pipe for heat exchange with exhaust gas flowing through an inside of the engine exhaust passage.

Advantageous Effects of Invention

By forming heat exchange fins for heat exchange with exhaust gas on the outer circumferential surface of the hydrogen supply pipe, the temperature of the reformed gas falls. Due to this, hydrogen contained in the reformed gas is kept from being consumed by self igniting, so it is possible to make the temperature of the exhaust treatment catalyst rapidly rise. Furthermore, by forming heat exchange fins on the outer circumferential surface of the hydrogen supply pipe, the heat of the reformed gas is efficiently transmitted to the exhaust gas. As a result, the temperature of the exhaust gas rises and accordingly a rise in temperature of the exhaust treatment catalyst is promoted.

BRIEF DESCRIPTION OF DRAWINGS

FIG. 5 is a view for explaining a reform reaction of diesel fuel.

DESCRIPTION OF EMBODIMENTS

Figure 1:
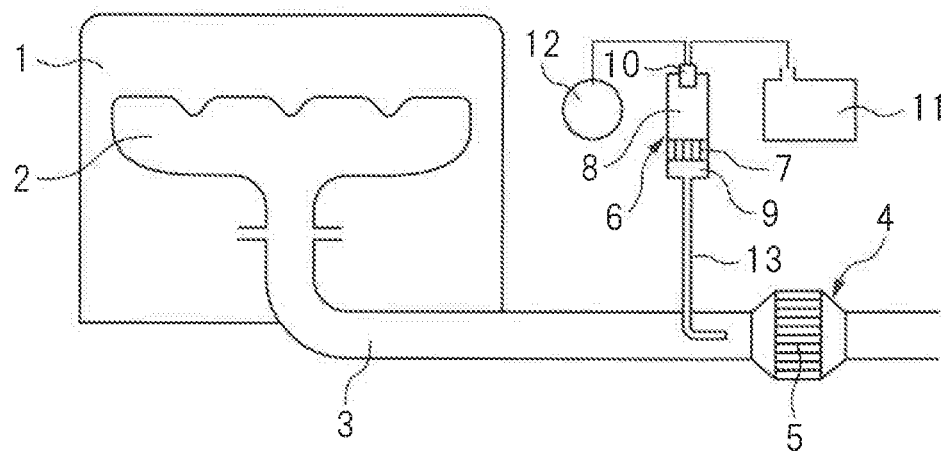
FIG. 1 is an overall view of an internal combustion engine.

FIG. 1 is an overall view of a compression ignition type internal combustion engine. Referring to FIG. 1, 1 indicates an engine body, 2 an exhaust manifold, 3 an exhaust pipe, 4 an exhaust treatment device connected to the exhaust pipe 3, 5 an exhaust treatment catalyst held inside the exhaust treatment device 4, and 6 a reformer for forming reformed gas containing hydrogen. The reformer 6 is provided with a reforming catalyst 7, a burner combustion chamber 8 formed at one side of the reforming catalyst 7, a reformed gas outflow chamber 9 formed at the other side of the reforming catalyst 7, and a burner 10. The burner 10 is connected to a fuel tank 11 and an air pump 12. Fuel supplied from the fuel tank 11 and air supplied from the air pump 12 are supplied from the burner 10 to the inside of the burner combustion chamber 8.

The fuel supplied from the burner 10 is made to burn inside the burner combustion chamber 8. Next, the produced combustion gas is sent into the reforming catalyst 7 and reformed whereby reformed gas containing hydrogen is produced in the reforming catalyst 7. The reformed gas containing hydrogen produced at the reforming catalyst 7 is sent into the reformed gas outflow chamber 9. The reformed gas containing hydrogen sent into the reformed gas outflow chamber 9 is supplied through a hydrogen supply pipe 13 extending from the reformed gas outflow chamber 9 to the inside of the exhaust pipe 3, to the inside of the exhaust pipe 3 upstream of the exhaust treatment catalyst 5, that is, to the inside of the engine exhaust passage upstream of the exhaust treatment catalyst 5. This exhaust treatment catalyst 5 is comprised of an oxidation catalyst, $NO_X$ storage catalyst, or catalyst-equipped particulate filter.

Figure 2A:
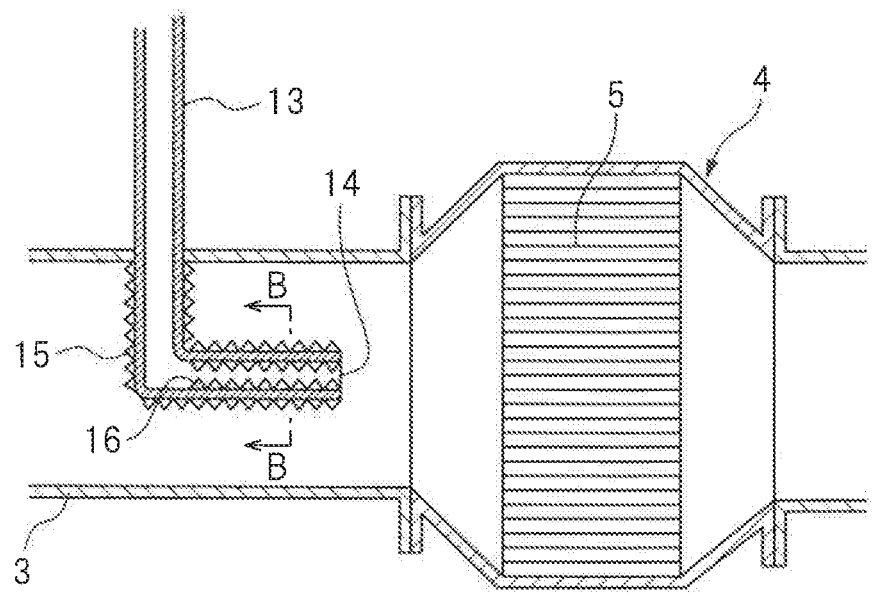
FIG. 2A and FIG. 2B are respectively an enlarged cross-sectional side view of the surroundings of an exhaust treatment device in FIG. 1 and a cross-sectional view along a cross-section B-B in FIG. 2A.

FIG. 2A is an enlarged cross-sectional side view of the surroundings of the exhaust treatment device 4 shown in FIG. 1. Referring to FIG. 2A, the hydrogen supply pipe 13 is comprised of a hollow metal pipe. The front end part of this hydrogen supply pipe 13 extends from an outside of the exhaust pipe 3 through a wall of the exhaust pipe 3 to an inside of the exhaust pipe 3. The front end part of the hydrogen supply part 13 is bent at the center part at the inside of the exhaust pipe 3 in the axial direction of the exhaust pipe 3 so that the front end opening part 14 of the hydrogen supply pipe 13 faces the upstream side end face of the exhaust treatment catalyst 5. Note that, in the example shown in FIG. 2A, the front end part of the hydrogen supply pipe 13 forms an L-shape inside the exhaust pipe 3.

Figure 2B:
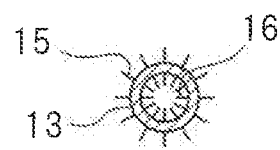

On the other hand, as shown in FIG. 2A and FIG. 2B, a plurality of heat exchange fins 15 for heat exchange with the exhaust gas flowing through the inside of the exhaust pipe 3 are formed on the outer circumferential surface of the hydrogen supply pipe 13 positioned inside the exhaust pipe 3. In other words, a plurality of heat exchange fins 15 for heat exchange with the exhaust gas flowing through the inside of the engine exhaust passage are formed on the outer circumferential surface of the hydrogen supply pipe 13 inserted inside the engine exhaust passage. As will be understood from FIG. 2A and FIG. 2B, these heat exchange fins 15 are comprised of thin fins extending in the direction of flow of exhaust gas at the inside of the exhaust pipe 3. Further, in the example shown in FIG. 2A and FIG. 2B, heat exchange fins 15 are formed over the entire outer circumferential surface of the hydrogen supply pipe 13 positioned inside the exhaust pipe 3.

On the other hand, in the example shown in FIG. 2A and FIG. 2B, a plurality of heat exchange fins 16 for heat exchange with the hydrogen flowing through the inside of the hydrogen supply pipe 13, more accurately for heat exchange with the reformed gas containing hydrogen, are also formed on the inner circumferential surface of the hydrogen supply pipe 13 positioned inside the exhaust pipe 3. Note that, in the example shown in FIG. 2A and FIG. 2B, these heat exchange fins 16 are formed in the hydrogen supply pipe 13 positioned inside the exhaust pipe 3 only at the part extending along the axial line of the exhaust pipe 3.

Figure 3:
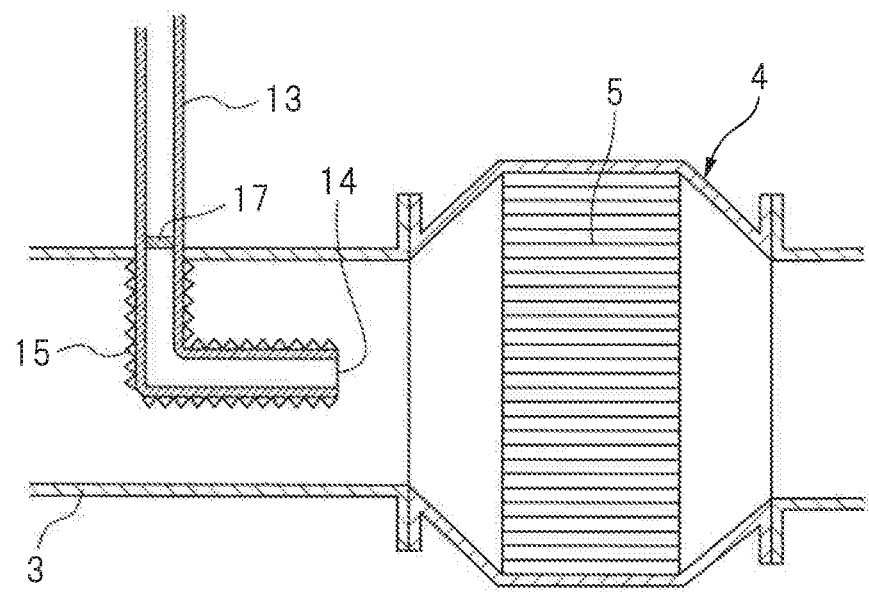
FIG. 3 is an enlarged cross-sectional side view of the surroundings of an exhaust treatment device showing another embodiment.

FIG. 3 shows a modification of the hydrogen supply pipe 13. In the example shown in FIG. 3, in the same way as the example shown in FIG. 2A and FIG. 2B, a plurality of heat exchange fins 15 for heat exchange with the exhaust gas flowing through the inside of the exhaust pipe 3 are formed on the outer circumferential surface of the hydrogen supply pipe 13 positioned at the inside of the exhaust pipe 3. As opposed to this, in the example shown in FIG. 3, unlike the example shown in FIG. 2A and FIG. 2B, heat exchange fins are not formed on the inner circumferential surface of the hydrogen supply pipe 13 positioned inside the exhaust pipe 3. Instead of this, in the example shown in FIG. 3, a swirl flow generator 17 for imparting a swirl flow around the axis of the hydrogen supply pipe 13 to the hydrogen flowing through the inside of the hydrogen supply pipe 13, more accurately to the reformed gas containing hydrogen, is arranged at a position inside the hydrogen supply pipe 13 and outside of the exhaust pipe 3.

Figure 4A:
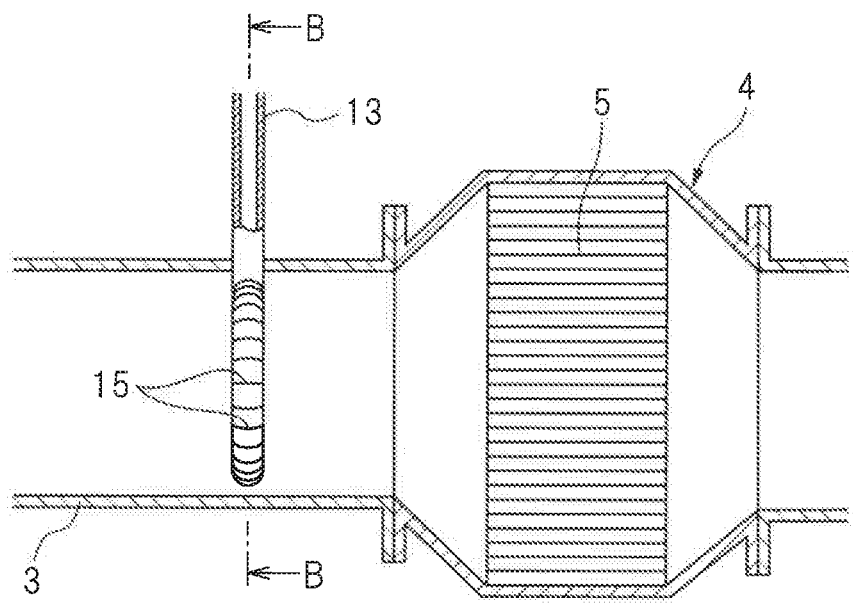
FIG. 4A and FIG. 4B are respectively an enlarged cross-sectional side view of the surroundings of an exhaust treatment device showing still another embodiment and a cross-sectional view along a cross-section B-B in FIG. 4A.
Figure 4B:
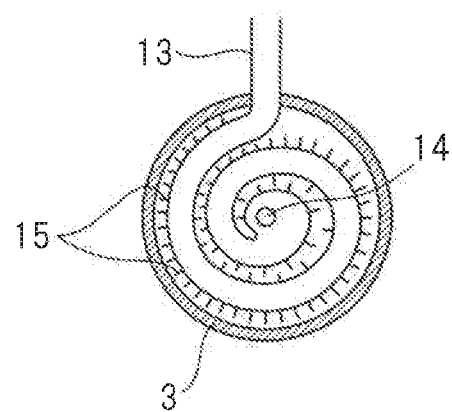

FIG. 4A and FIG. 4B show another modification of the hydrogen supply pipe 13. In the example shown in FIG. 4A and FIG. 4B, the front end part of the hydrogen supply pipe 13 extends inside of the exhaust pipe 3 in a vortex shape around the axis of the exhaust pipe 3 up to the axis of the exhaust pipe 3 and the front end opening part 14 of the hydrogen supply pipe 13 is oriented toward the upstream side end face of the exhaust treatment catalyst 5. In this modification as well, as shown in FIG. 4A and FIG. 4B, a plurality of heat exchange fins 15 for heat exchange with the exhaust gas flowing through the inside of the exhaust pipe 3 are formed on the outer circumferential surface of the hydrogen supply pipe 13 positioned at the inside of the exhaust pipe 3. These heat exchange fins 15 are comprised of thin fins extending in the direction of flow of the exhaust gas inside the exhaust pipe 3.

As explained above, in the reformer 6, hydrogen is formed by reforming the fuel. Therefore, next, referring to FIG. 5, the reform reaction in the case of using diesel fuel as fuel will be simply explained. FIGS. 5(a) and (b) show the reaction formula when a complete oxidation reaction is performed and the reaction formula when a partial oxidation reform reaction is performed in the case of using the generally used diesel fuel as fuel. Note that, the amounts of heat generated $\Delta H^0$ in the reaction formulas are shown by the lower heating value (LHV). In the reformer 6 shown in FIG. 1, the fuel and air supplied from the burner 10 react at the reforming catalyst 7 by the partial oxidation reform reaction shown in FIG. 5(b) whereby hydrogen is formed. This partial oxidation reform reaction, as shown by the reaction formula of the partial oxidation reform reaction of FIG. 5(b), is performed by a rich air-fuel ratio of an $O_2/C$ molar ratio 0.5 indicating the ratio of the air and fuel which are made to react. At this time, CO and $H_2$ are formed.

Figure 6A:
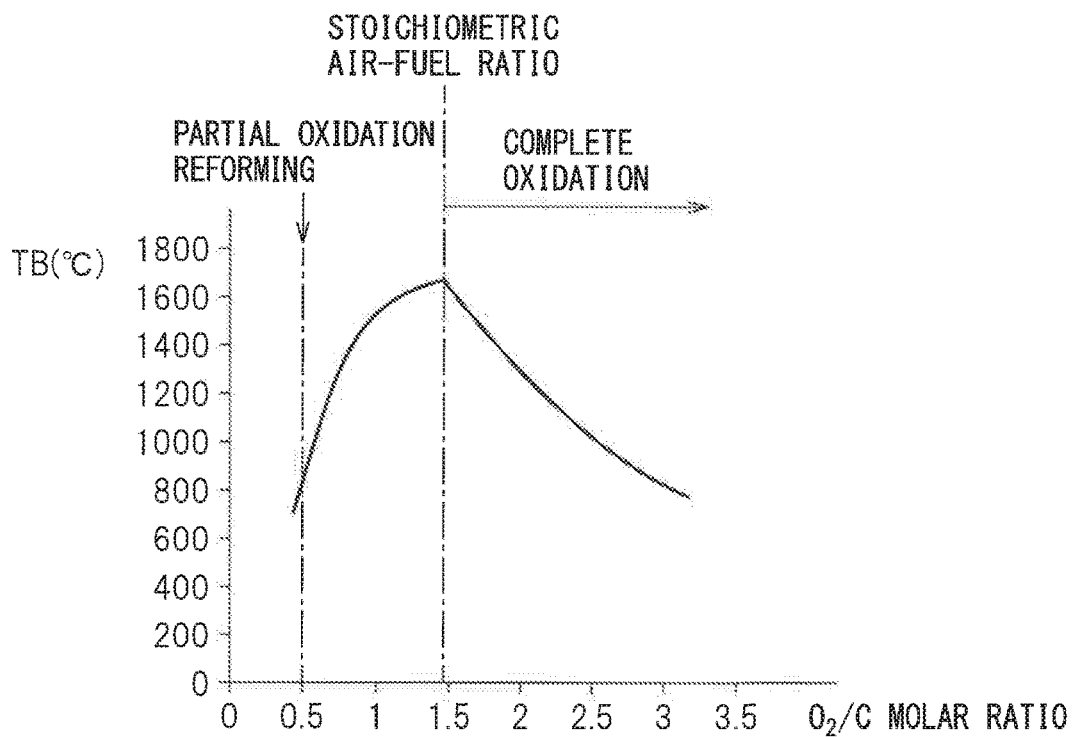
FIG. 6A and FIG. 6B are respectively a view showing a relationship between a reaction equilibrium temperature TB and an $O_2/C$ molar ratio and a view showing a relationship between a number of molecules formed per atom of carbon and an $O_2/C$ molar ratio.

FIG. 6A shows the relationship between the reaction equilibrium temperature TB when the air and fuel are made to react at the reforming catalyst 7 and reach an equilibrium and the $O_2/C$ molar ratio of the air and fuel. Note that, the solid line of FIG. 6A shows the theoretical value when the air temperature is 25° C. As shown by the solid line of FIG. 6A, when the partial oxidation reform reaction is performed by a rich air-fuel ratio of an $O_2/C$ molar ratio=0.5, the equilibrium reaction temperature TB becomes about 830° C. At this time, substantially 830° C. reformed gas flows out from the reforming catalyst 7 to the inside of the reformed gas outflow chamber 9 and the reformed gas flowing out to the inside of the reformed gas outflow chamber 9 is sent through the hydrogen supply pipe 13 to the inside of the exhaust pipe 3. Note that, the actual equilibrium reaction temperature TB at this time is somewhat lower than 830° C., therefore, actually, the temperature of the reformed gas flowing out to the inside of the reformed gas outflow chamber 9 is somewhat lower than 830° C.

On the other hand, as will be understood from the reaction formula of the complete oxidation reaction of FIG. 5(a), the ratio of the air and fuel when the $O_2/C$ molar ratio=1.4575 becomes the stoichiometric air-fuel ratio. As shown in FIG. 6A, the reaction equilibrium temperature TB becomes the highest when the ratio of the air and fuel becomes the stoichiometric air-fuel ratio. When the $O_2/C$ molar ratio is between 0.5 and 1.4575, in part, the partial oxidation reform reaction is performed, while in part, the complete oxidation reaction is performed. In this case, the larger the $O_2/C$ molar ratio, the larger the ratio by which the complete oxidation reaction is performed compared with the ratio by which the partial oxidation reform reaction is performed, so the larger the $O_2/C$ molar ratio, the higher the reaction equilibrium temperature TB.

Figure 6B:
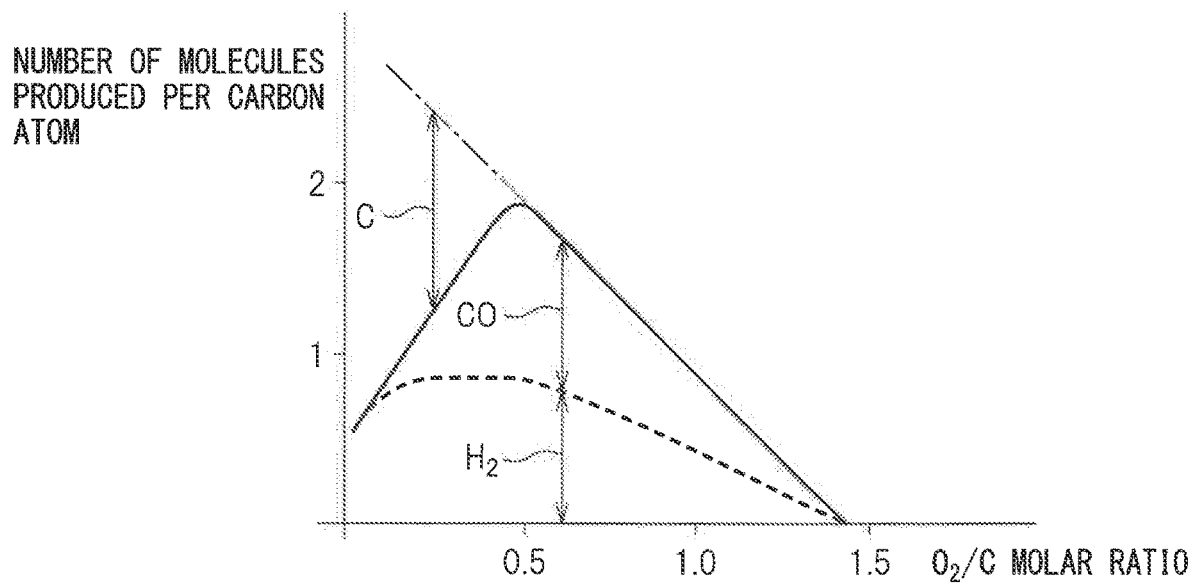

On the other hand, FIG. 6B shows the relationship between the number of molecules ($H_2$ and CO) formed per atom of carbon and the $O_2/C$ molar ratio. As explained above, the larger the $O_2/C$ molar ratio than 0.5, the smaller the ratio by which the partial oxidation reform reaction is performed. Therefore, as shown in FIG. 6B, the greater the $O_2/C$ molar ratio than 0.5, the smaller the amounts of formation of $H_2$ and CO. Further, as shown in FIG. 6A, if the $O_2/C$ molar ratio becomes larger than 0.5, the equilibrium reaction temperature TB rapidly rises and the temperature of the reforming catalyst 7 also rapidly rises. Therefore, if making the $O_2/C$ molar ratio larger than 0.5, the reforming catalyst 7 ends up deteriorating due to heat. On the other hand, as shown in FIG. 6B, if the $O_2/C$ molar ratio becomes smaller than 0.5, the excess carbon C not able to be reacted with increases. This excess carbon C deposits inside the pores of the substrate of the reforming catalyst 7 to cause so-called "coking". If coking occurs, the reform ability of the reforming catalyst 7 remarkably falls. Therefore, to avoid the occurrence of coking, the $O_2/C$ molar ratio has to be kept from becoming smaller than 0.5.

Further, as will be understood from FIG. 6B, when the $O_2/C$ molar ratio is 0.5, the amount of formation of hydrogen becomes the largest in the range where no excess carbon C is formed. Therefore, when performing the partial oxidation reform reaction for forming hydrogen, to avoid coking and heat deterioration of the reforming catalyst 7 while enabling the most efficient formation of hydrogen, the $O_2/C$ molar ratio is made 0.5 or slightly higher than 0.5. The reformed gas containing hydrogen formed at this time falls somewhat in temperature up to reaching the exhaust pipe 3 and becomes 700° C. to 920° C. or so.

Next, for example, the case of making the temperature of the exhaust treatment catalyst 5 rise when, like at the time of engine warm-up operation, the temperature of the exhaust treatment catalyst 5 is low will be explained. Now then, when the temperature of the exhaust treatment catalyst 5 is low, if high temperature reformed gas containing hydrogen is supplied from the hydrogen supply pipe 13, the exhaust treatment catalyst 5 is heated by not only the heat of the exhaust gas, but also the heat of the supplied reformed gas and rises in temperature. At this time, the exhaust treatment catalyst 5 rises in temperature due to the heat of exhaust gas and heat of reformed gas transferred by heat transfer to the exhaust treatment catalyst 5. On the other hand, as explained above, the exhaust treatment catalyst 5 is comprised of an oxidation catalyst, $NO_X$ storage catalyst, or catalyst-equipped particulate filter. This exhaust treatment catalyst 5 carries a precious metal catalyst such as platinum Pt, palladium Pd, or rhodium Rh. If in this way the exhaust treatment catalyst 5 carries a precious metal catalyst, the hydrogen contained in the reformed gas supplied from the hydrogen supply pipe 13 will be made to react with oxygen on the precious metal catalyst, and the exhaust treatment catalyst 5 will further rise in temperature due to the heat of oxidation reaction generated at this time.

In this regard, when the exhaust treatment catalyst 5 is heated by the heat of oxidation reaction of hydrogen in this way, the exhaust treatment catalyst 5 itself is directly heated by the heat of oxidation reaction of hydrogen. Therefore, if the exhaust treatment catalyst 5 is heated by the heat of oxidation reaction of hydrogen, the temperature of the exhaust treatment catalyst 5 is made to rise far more rapidly compared with the case where the exhaust treatment catalyst 5 is heated due to heat transfer of the heat of exhaust gas and heat of reformed gas. Therefore, to make the temperature of the exhaust treatment catalyst 5 rise, utilizing the heat of oxidation reaction of hydrogen is extremely effective. For this reason, it is necessary to send as much hydrogen as possible from the hydrogen supply pipe 13 to the inside of the exhaust treatment catalyst 5.

Figure 7:
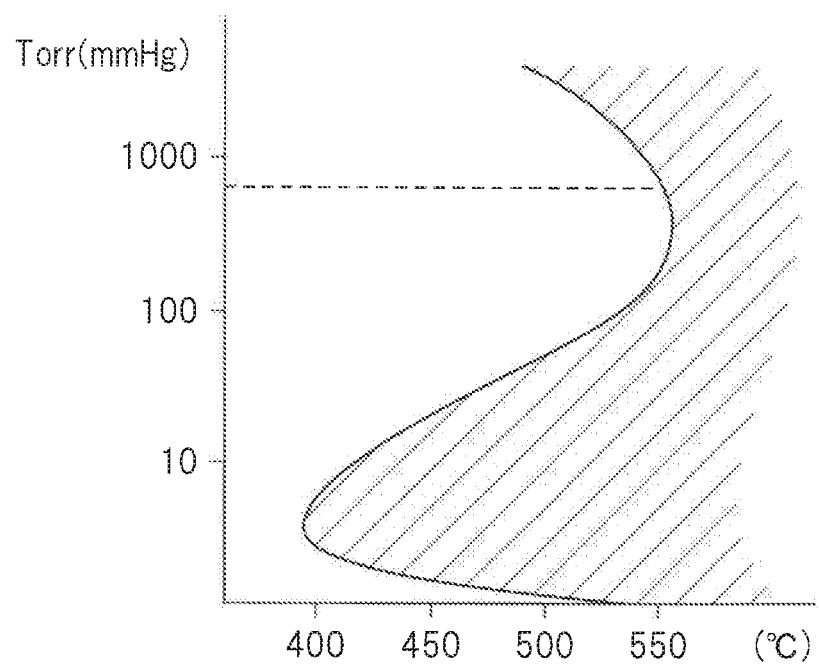
FIG. 7 is a view showing a region where hydrogen will be consumed by self ignition.

In this regard, hydrogen reacts with oxygen ($2H_2+O_2 \rightarrow 2H_2O$) and is consumed by self ignition if there is oxygen present in the surroundings and the temperature of the surroundings becomes high. The hatched region of FIG. 7 shows the region where hydrogen reacts with oxygen and hydrogen is consumed by self ignition in this way. Note that, in FIG. 7, the abscissa shows the temperature around the hydrogen, that is, the ambient air temperature (° C.), while the ordinate shows the pressure (mmHg). Further, in FIG. 7, the broken line shows the atmospheric pressure. Therefore, from FIG. 7, it will be understood that if the ambient air temperature becomes 550° C. or more, hydrogen will be consumed by self ignition. On the other hand, the exhaust gas pressure inside the exhaust pipe 3 upstream of the exhaust treatment catalyst 5 is substantially atmospheric pressure. Therefore, when hydrogen is supplied from the hydrogen supply pipe 13 to the inside of the exhaust pipe 3, if the ambient air temperature is about 550° C. or more, this hydrogen will be consumed by self ignition.

Now then, to send as much hydrogen as possible from the hydrogen supply pipe 13 to the inside of the exhaust treatment catalyst 5, it is necessary to make the hydrogen supplied from the hydrogen supply pipe 13 to the inside of the exhaust pipe 3 reach the exhaust treatment catalyst 5 without being consumed by self ignition. For this, when hydrogen is supplied from the hydrogen supply pipe 13 to the inside of the exhaust pipe 3, the temperature around the supplied hydrogen, that is, the ambient air temperature, has to be made to decrease to about 550° C. or less. On the other hand, as explained above, the reformed gas containing hydrogen formed at the reformer 6 becomes 700° C. to 920° C. or so around when reaching the exhaust pipe 3. Therefore, in order to send as much hydrogen as possible from the hydrogen supply pipe 13 to the inside of the exhaust treatment catalyst 5, it is necessary to lower the temperature of the hydrogen, which is 700° C. to 920° C. or so while hydrogen is flowing through the hydrogen supply pipe 13, so that the temperature around the hydrogen supplied from the hydrogen supply pipe 13, that is, the ambient air temperature, becomes about 550° C. or less.

Therefore, in an embodiment according to the present invention, a plurality of heat exchange fins 15 for heat exchange with exhaust gas flowing through the inside of the exhaust pipe 3 are formed on at least the outer circumferential surface of the hydrogen supply pipe 13 positioned inside the exhaust pipe 3. If in this way a plurality of heat exchange fins 15 are formed on the outer circumferential surface of the hydrogen supply pipe 13, due to the heat exchange action with the exhaust gas, which is lower in temperature than the temperature of the hydrogen flowing through the hydrogen supply pipe 13, the temperature of the hydrogen flowing through the hydrogen supply pipe 13 is made to fall so that the temperature around the hydrogen supplied from the hydrogen supply pipe 13 to the inside of the exhaust gas, that is, the ambient air temperature, becomes about 550° C. or less. As a result, the hydrogen supplied from the hydrogen supply pipe 13 to the exhaust pipe 3 will be sent into the exhaust treatment catalyst 5 without being consumed by self ignition, and the temperature of the exhaust treatment catalyst 5 is made to rapidly rise due to the heat of oxidation reaction of the hydrogen generated in the exhaust treatment catalyst 5.

On the other hand, the exhaust gas flowing around the hydrogen supply pipe 13 is heated by the heat exchange action with the hydrogen flowing through the hydrogen supply pipe 13 and rises in temperature. This raised temperature exhaust gas flows into the exhaust treatment catalyst 5 whereby the temperature of the exhaust treatment catalyst 5 is made to further rise. That is, the amount of heat used for cooling the hydrogen flowing through the inside of the hydrogen supply pipe 13 can be effectively utilized for raising the temperature of the exhaust treatment catalyst 5. Note that, the cooling action of the hydrogen flowing through the hydrogen supply pipe 13 is further promoted by formation of the heat exchange fins 15 over the entire outer circumferential surface of the hydrogen supply pipe 13 and, as shown in FIG. 2A and FIG. 2B, is further promoted by formation of a plurality of the heat exchange fins 16 over the inner circumferential surface of the hydrogen supply pipe 13 positioned inside of the exhaust pipe 3.

In the modification shown in FIG. 3, the swirl flow generator 17 is arranged inside the hydrogen supply pipe 13 positioned at the outside side part of the exhaust pipe 3, that is, at the entrance of the hydrogen supply pipe 13 to the inside of the exhaust pipe 3. Due to this swirl flow generator 17, a swirl flow about the axis of the hydrogen supply pipe 13 is imparted to the reformed gas containing hydrogen flowing through the hydrogen supply pipe 13. As a result, heat exchange between the hydrogen flowing through the hydrogen supply pipe 13 and the exhaust gas is promoted and the cooling action of the hydrogen flowing through the hydrogen supply pipe 13 is promoted. Further, in the modification shown in FIG. 4A and FIG. 4B, the contact area of the hydrogen supply pipe 13 with the exhaust gas is increased and the heat exchange time with the exhaust gas is also increased, so the cooling action of the hydrogen flowing through the hydrogen supply pipe 13 is further promoted.

The invention claimed is:

1. An exhaust purification system of an internal combustion engine comprising:

a reformer, an exhaust treatment catalyst arranged in an engine exhaust passage, a hydrogen supply pipe inserted inside the engine exhaust passage upstream of the exhaust treatment catalyst, hydrogen generated in the reformer being supplied to the engine exhaust passage upstream of the exhaust treatment catalyst via the hydrogen supply pipe, and heat exchange fins formed on an outer circumferential surface of the hydrogen supply pipe for heat exchange with exhaust gas flowing through an inside of the engine exhaust passage.

2. The exhaust purification system of an internal combustion engine according to claim 1, wherein heat exchange fins for heat exchange with reformed gas containing hydrogen and flowing through the inside of the hydrogen supply pipe are further formed on an inner circumferential surface of the hydrogen supply pipe.

3. The exhaust purification system of an internal combustion engine according to claim 1, wherein a swirl flow generator imparting a swirl flow about an axis of the hydrogen supply pipe to reformed gas containing hydrogen flowing through the inside of the hydrogen supply pipe is arranged inside of the hydrogen supply pipe.

4. The exhaust purification system of an internal combustion engine according to claim 1, wherein a front end part of the hydrogen supply pipe extends from outside of an exhaust pipe through a wall of the exhaust pipe to the inside of the exhaust pipe and is bent in an axial direction of the exhaust pipe so that an opening part of the front end of the hydrogen supply pipe faces an upstream side end face of the exhaust treatment catalyst.

* * * * *